United States Patent
Worden et al.

(10) Patent No.: US 12,234,857 B2
(45) Date of Patent: Feb. 25, 2025

(54) FASTCLAMP ASSEMBLY FOR MOUNTING A PHOTOVOLTAIC MODULE

(71) Applicant: Gamechange Solar Corp., Norwalk, CT (US)

(72) Inventors: Andrew Barron Worden, Redding, CT (US); Woo Kim, Little Neck, NY (US)

(73) Assignee: Gamechange Solar Corp., Norwalk, CT (US)

( * ) Notice: Subject to any disclaimer, the term of this patent is extended or adjusted under 35 U.S.C. 154(b) by 0 days.

(21) Appl. No.: 17/539,284

(22) Filed: Dec. 1, 2021

(65) Prior Publication Data
US 2023/0392627 A1 Dec. 7, 2023

Related U.S. Application Data

(60) Provisional application No. 63/121,046, filed on Dec. 3, 2020.

(51) Int. Cl.
*F16B 5/06* (2006.01)
*H02S 20/20* (2014.01)

(52) U.S. Cl.
CPC .......... *F16B 5/0635* (2013.01); *F16B 5/0642* (2013.01); *H02S 20/20* (2014.12)

(58) Field of Classification Search
CPC ...... F16B 5/0635; F16B 5/0642; H02S 20/20; Y02E 10/47; F24S 25/634; F24S 25/632
See application file for complete search history.

(56) References Cited

U.S. PATENT DOCUMENTS

| | | | |
|---|---|---|---|
| 9,647,433 B2* | 5/2017 | Meine | F24S 25/634 |
| 10,020,773 B2* | 7/2018 | Molina | F24S 25/33 |
| 10,742,160 B2* | 8/2020 | Kobayashi | H02S 30/00 |
| 10,971,870 B2* | 4/2021 | Lynn | H01R 13/73 |
| 2013/0048815 A1* | 2/2013 | Wagner | F24S 25/61 248/228.1 |
| 2016/0344338 A1* | 11/2016 | Schutz | H01R 13/6273 |
| 2018/0191289 A1* | 7/2018 | Zhu | H02S 20/23 |
| 2020/0403562 A1* | 12/2020 | Wang | F24S 25/636 |

* cited by examiner

*Primary Examiner* — Robert Sandy
*Assistant Examiner* — Rowland Do
(74) *Attorney, Agent, or Firm* — O'Shea P.C.

(57) ABSTRACT

An assembly for mounting a photovoltaic panel includes a support that includes first and second parallel flange surfaces and mounting clamp bases each fastened to an associated one of the parallel flange surfaces. Each of the mounting clamp bases includes a clamp base web including through holes longitudinally aligned along the web; domed uptakes radially extending from the clamp base web, where the domed uptakes separate the clamp base web from opposing longitudinally extending channels each formed from an associated channel base surface, an associated channel sidewall and channel top surface; opposing upright fingers extend from the channel top surfaces in a direction perpendicular to the clamp base web surface, where each of the upright fingers includes one or more serrated edges on each of its longitudinal sidewalls; and chamfered mounting clamp base protuberances that extend from the clamp base web.

6 Claims, 18 Drawing Sheets

FASTCLAMP ASSEMBLY FOR MOUNTING A PHOTOVOLTAIC MODULE

CROSS REFERENCE TO RELATED APPLICATIONS

This application claims the benefit of U.S. Provisional Patent Application Ser. No. 63/121,046 filed Dec. 3, 2020, which is hereby incorporated by reference.

BACKGROUND OF THE INVENTION

1. Technical Field

This disclosure relates generally to a solar panel installation and, more particularly, to apparatuses and assemblies for use in a solar panel installation.

2. Background Information

To fasten the solar panels to a tracker mount (e.g., a single axis tracker), various systems, mounting brackets, clamps and other fasteners exist. In utility scale solar power plants not only must the system for mounting photovoltaic panels be secure and rugged, but the system must also be relatively easy and quick to install.

There is a need for an improved assembly for mounting a photovoltaic module.

SUMMARY OF THE DISCLOSURE

According to an aspect of the disclosure, an assembly for mounting a photovoltaic panel comprises a support that includes first and second parallel flange surfaces; first and second mounting clamp bases each fastened to an associated one of the first and second parallel flange surfaces, where each of the first and second mounting clamp bases comprises (i) a clamp base web including first and second through holes longitudinally aligned along the web; (ii) domed uptakes radially extending from the clamp base web, where the domed uptakes separate the clamp base web from opposing first and second longitudinally extending channels each formed from an associated channel base surface, an associated channel sidewall and a channel top surface; (iii) opposing first and second upright fingers extending from each of the channel top surfaces in a direction perpendicular to the clamp base web surface, where each of the upright fingers includes one or more serrated edges on each of its longitudinal sidewalls; (iv) first and second chamfered mounting clamp base protuberances that extend upward from the clamp base web; and a first mounting end cap that includes a first chamfered end cap protuberance that extends from a first engagement surface and a second chamfered end cap protuberance that extends from a second engagement surface; where the first chamfered mounting clamp base protuberance engages the first chamfered end cap protuberance and the second chamfered mounting clamp base protuberance engages the second chamfered end cap protuberance as the first engagement surface passes into the first and second longitudinally extending channels.

The mount clamp base web may include a planar surface.

The channel sidewall may be separated from the channel base surface via a first radiused edge, and the channel sidewall may be separated from the channel top surface via a second radiused edge.

The first mounting end cap may be substantially J-shaped.

A radiused edge may separate the first upright finger and the first channel top surface.

According to another aspect of the disclosure, an assembly for mounting a photovoltaic panel comprises a support that includes first and second parallel flange surfaces; first and second mounting clamp bases each fastened to an associated one of the first and second parallel flange surfaces, where each of the first and second mounting clamp bases comprises (i) domed uptakes extending from the clamp base web, where the domed uptakes separate the clamp base web from opposing first and second longitudinally extending channels each formed from an associated channel base surface, an associated channel sidewall and a channel top surface; (ii) opposing first and second upright fingers extending from each of the channel top surfaces, where each of the upright fingers includes one or more serrated edges on each of its longitudinal sidewalls; (iii) first and second chamfered mounting clamp base protuberances that extend from the clamp base web; a first mounting end cap that includes a first chamfered end cap protuberance that extends from a first engagement surface and a second chamfered end cap protuberance that extends from a second engagement surface; where the first chamfered mounting clamp base protuberance engages the first chamfered end cap protuberance and the second chamfered mounting clamp base protuberance engages the second chamfered end cap protuberance as the first engagement surface passes into the first and second longitudinally extending channels.

DETAILED DESCRIPTION

Figure 1:
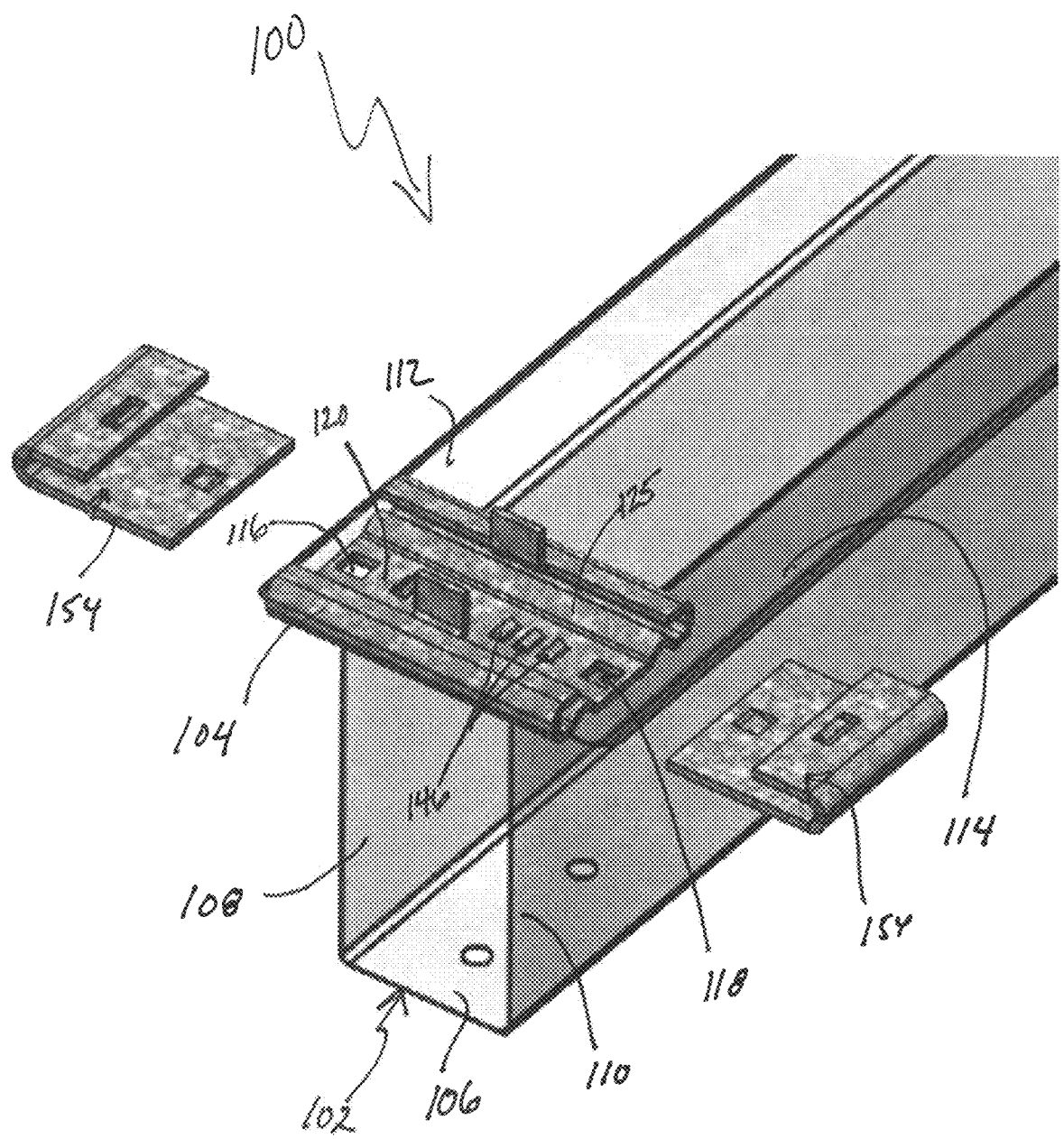
FIGS. 1 and 2 are perspective illustrations of a portion of a support (e.g., a purlin) with a mounting clamp base positioned on the support.
Figure 2:
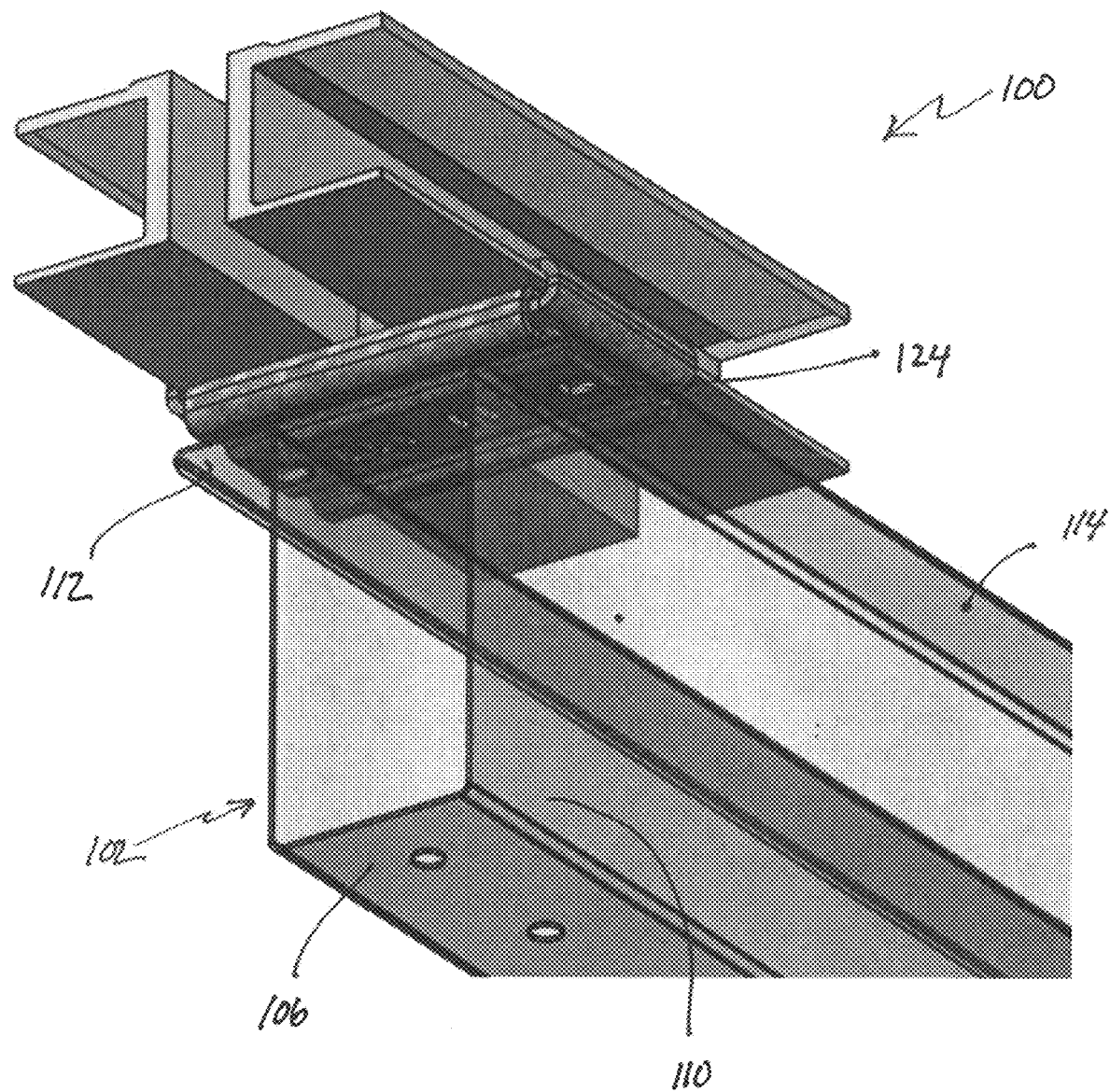

FIGS. 1 and 2 are perspective illustrations of an assembly 100 that includes a portion of a support 102 (e.g., a purlin)

with a mounting clamp base 104 positioned on the support. The support/purlin 102 includes a web 106 with first and second opposing sidewalls 108, 110, and flanges 112, 114 extending from a distal end of each of the sidewalls 108,110. To assist with quickly and securely attaching photovoltaic (PV) panels (not shown) to the assembly 100, the mounting clamp base 104 is positioned across the purlin flanges 112, 114. The mounting clamp base 104 includes first and second through holes 116, 118 in a mount clamp base web 120. The first and second through holes 116, 118 align with associated flange through holes 122, 124 (see FIG. 11), which allows the mounting clamp base 104 to be secured to the support/purlin 102 using first and second threaded fasteners (not shown in FIG. 1). The first and second threaded fasteners pass through the first and second through holes 116, 118 and the associated flange through holes 122, 124, respectively. Then cooperating first and second threaded nuts (e.g., a flanged nuts) are threaded onto their respective fastener.

Figure 3:
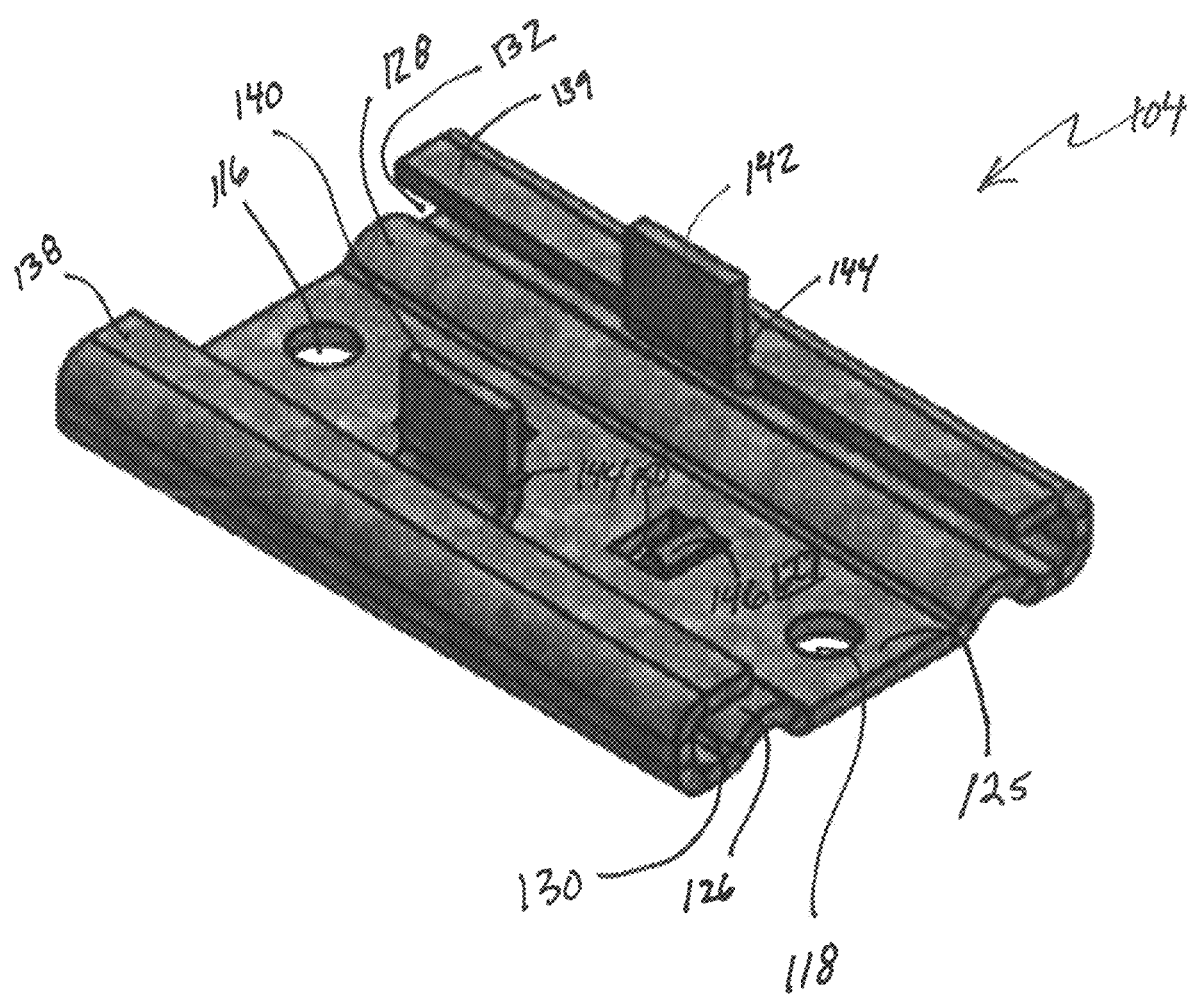
FIG. 3 is a perspective view of the mounting clamp base.
Figure 4:
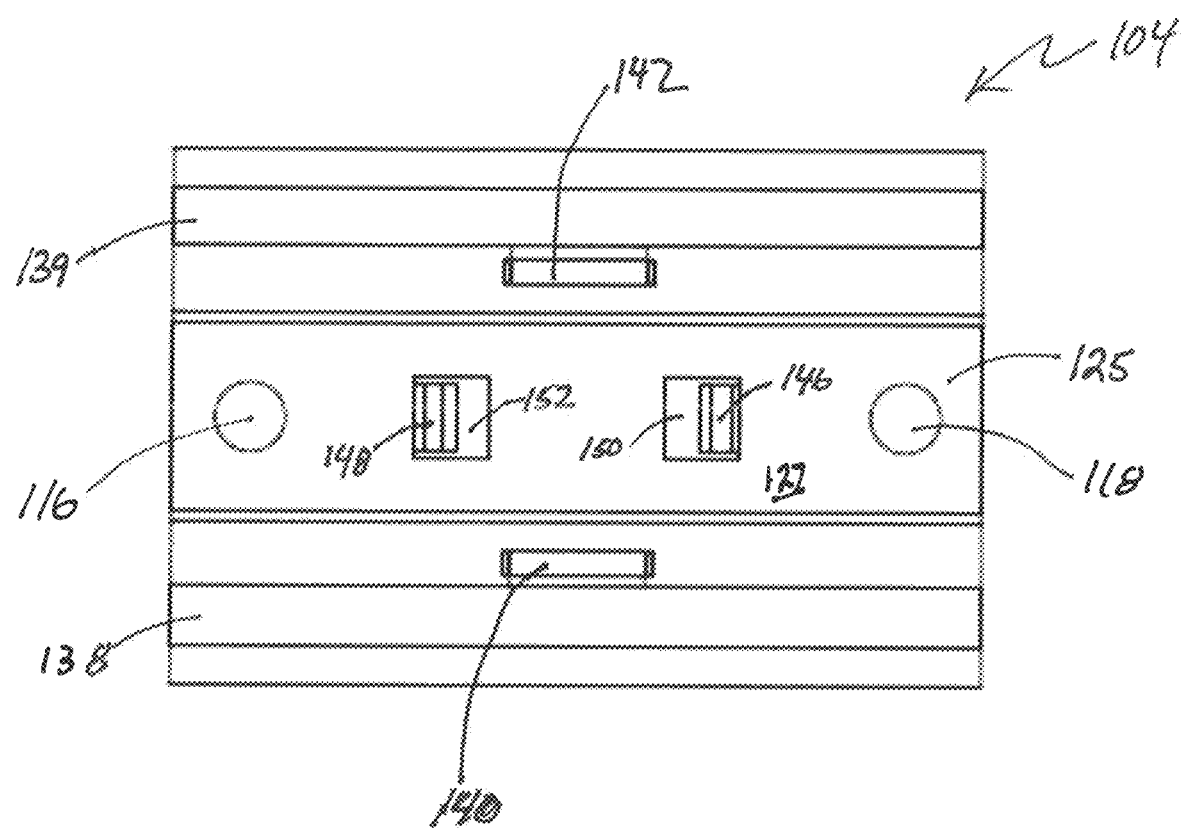
FIG. 4 is a top view of the mounting clamp base.
Figure 5:
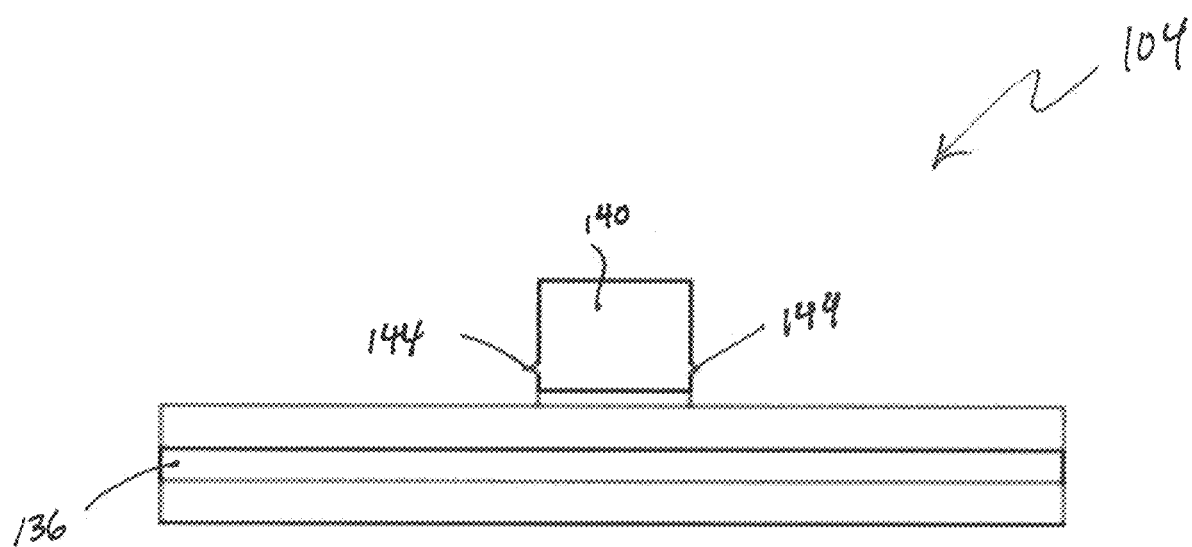
FIG. 5 is a first side view of the mounting clamp base.
Figure 6:
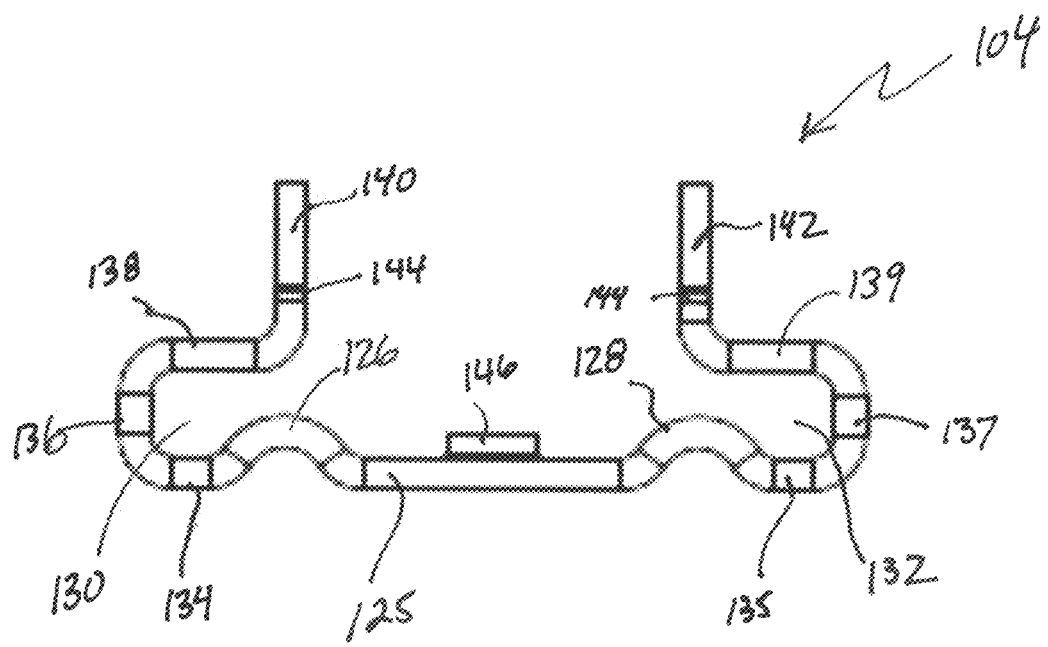
FIG. 6 is a second side view of the mounting clamp base.

FIG. 3 is a perspective view of the mounting clamp base 104. FIG. 4 is a top view of the mounting clamp base 104. FIG. 5 is a first side view of the mounting clamp base, and FIG. 6 is a second side view of the mounting clamp base. Referring to FIGS. 3-6, the mounting clamp base is preferably a unitary (i.e., single piece) component (e.g., metallic). A mount clamp base web 125 includes the first and second through holes 116, 118 longitudinally aligned along the web 125. The mount clamp base web 125 may include a planar top surface 127. Radially extending from the web 125 are domed uptakes 126, 128 that separate the web 125 from longitudinally extending channels 130, 132. Each channel 130, 132 includes a channel base surface 134, 135, a channel sidewall 136, 137 and channel top surface 138, 139, as best shown in FIG. 6. Each of these surfaces may be connected with a radiused edge. A radially interior side of the channel top surface 138 may partially or completely overhang an associated one of the domed uptakes 126, 128. Upright fingers 140, 142 extend from associated channel top surfaces 138, 139, respectively, in a direction perpendicular to the top surface 127 of the web 124. A radiused edge may separate the upright fingers 140, 142 and its associated one of the channel top surfaces 138, 139, respectively.

Each of the upright fingers 140, 142 may include one or more serrated edges 144 on each of its longitudinal sidewalls. To be discussed in more detail hereinafter, the serrated edges 144 penetrate structure that abuts against the longitudinal sidewalls of the upright fingers 140, 142.

Referring still to FIGS. 3-6, the mount clamp base web 125 includes a first and second chamfered protuberances 146, 148 that extend upward from the web 125. Adjacent to each of the first and second chamfered protuberances 146, 148 (see FIGS. 3 and 4) is an associated aperture 150, 152 from stamping/punching during formation of the chamfered protuberances 146, 148.

Figure 7:
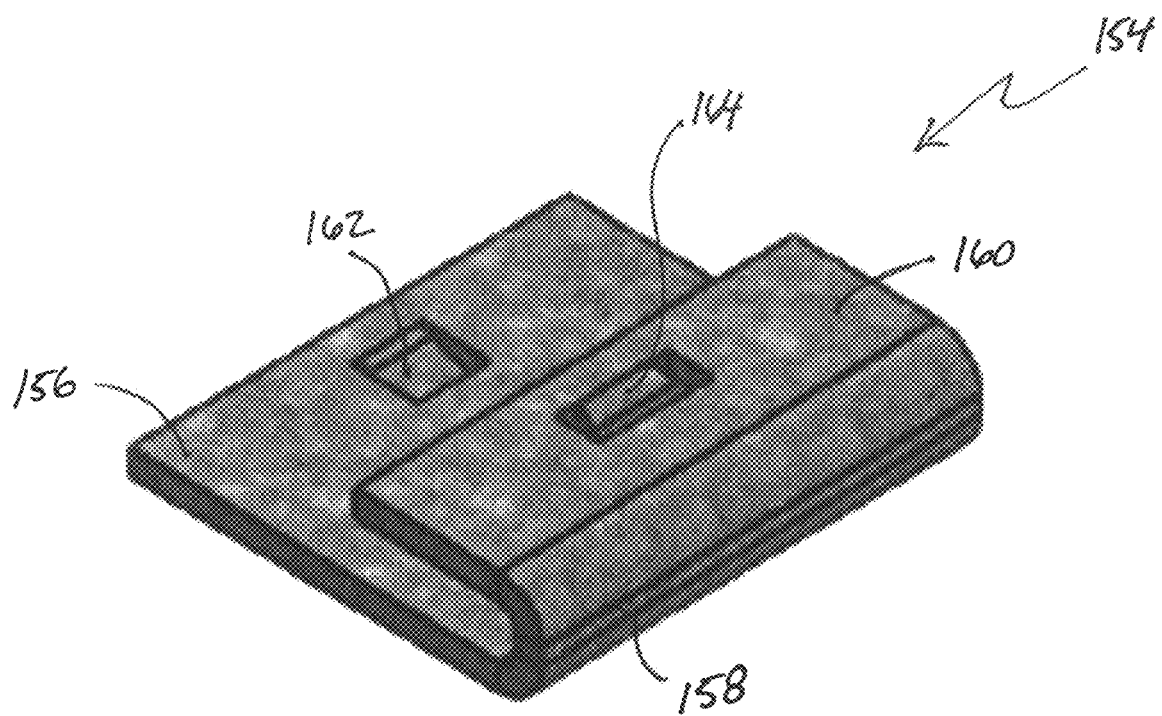
FIG. 7 is perspective view of a mount clamp end cap.
Figure 8:
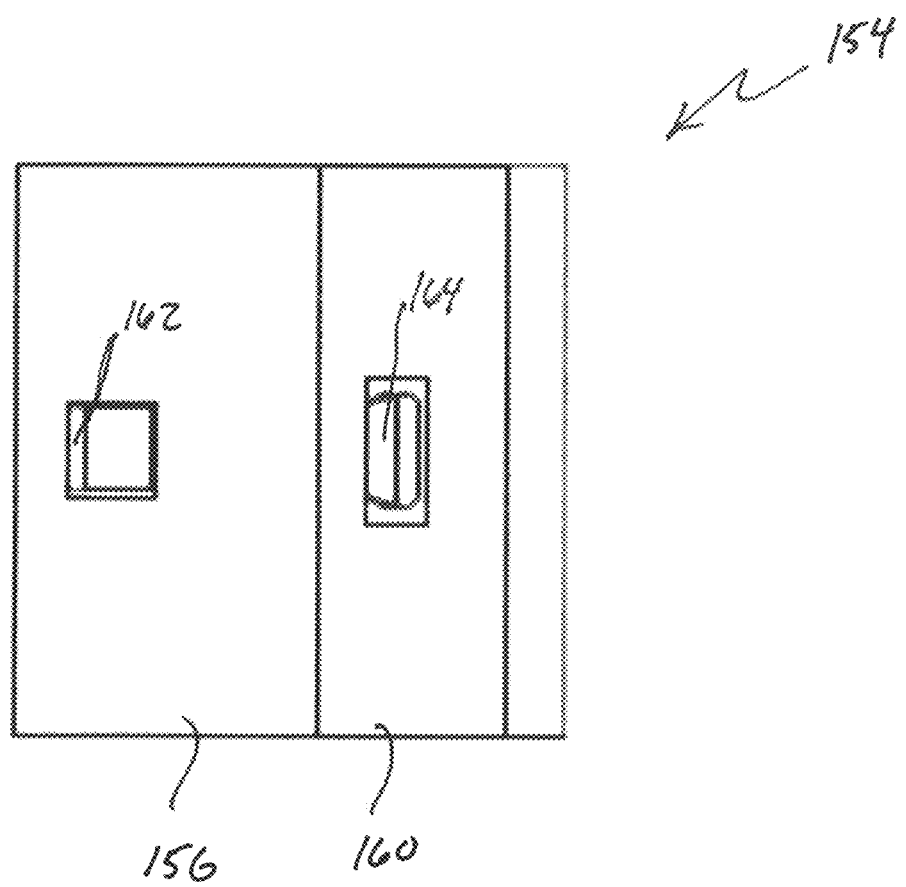
FIG. 8 is a top view of the end cap of FIG. 7.
Figure 9:
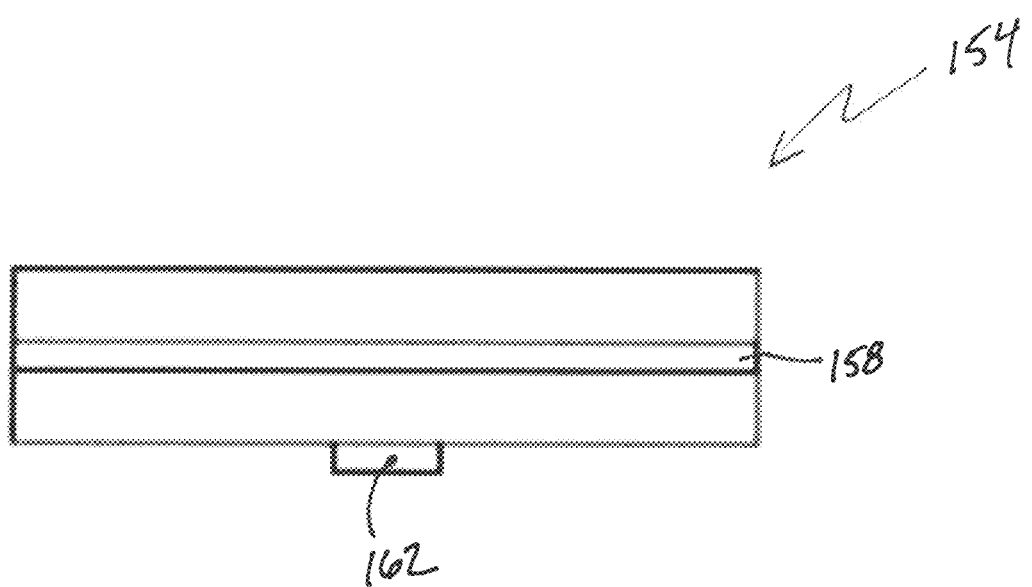
FIG. 9 is a first side view of the end cap of FIGS. 7-8.
Figure 10:
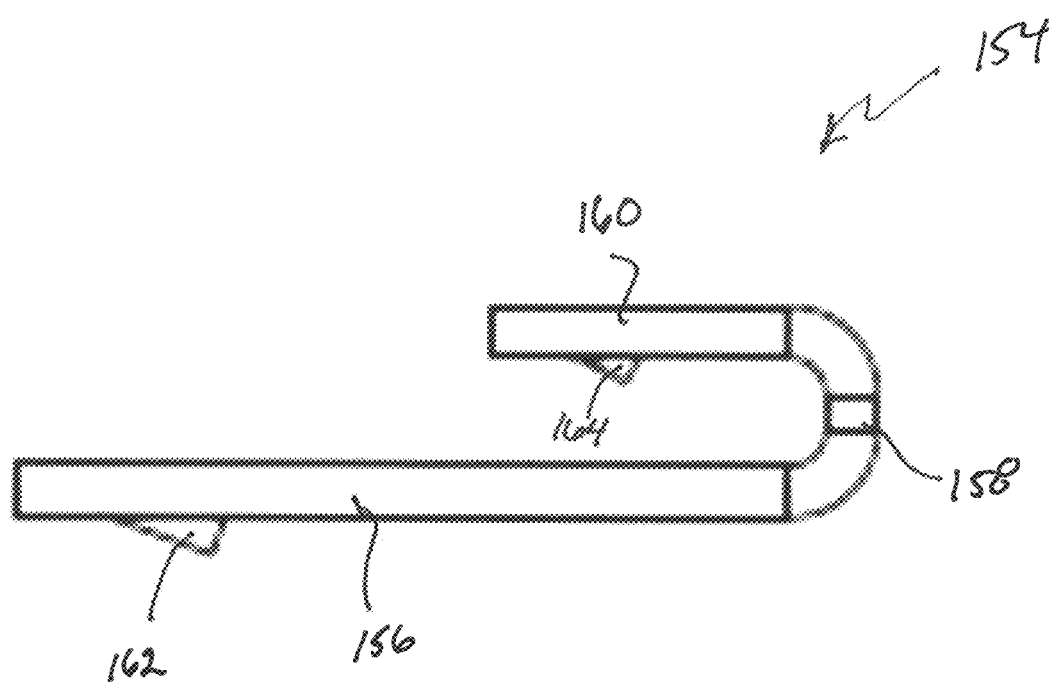
FIG. 10 is a second side view of the mounting clamp end cap of FIGS. 7-9.

FIG. 7 is perspective view of a mounting clamp end cap 154. FIG. 8 is a top view of the end cap 154. FIG. 9 is a first side view of the end cap, and FIG. 10 is a second side view of the end cap. Referring to FIGS. 7-10, the mounting clamp end cap 154 is preferably a unitary component (e.g., metallic). The end cap includes a first engagement surface 156, a radiused sidewall 158, and a second engagement surface 160. The radiused sidewall 158 separates the first and second engagement surfaces 156, 160.

Referring still to FIGS. 7-10, the first engagement surface 156 includes a first chamfered end cap protuberance 162 that extends radially outward from the first engagement surface 156. The second engagement surface 160 includes a second chamfered end cap protuberance 164 that extends radially inward from the second engagement surface. The chamfered end cap protuberances 162, 164 may be formed by stamping/punching the surfaces 156, 160.

Figure 11:
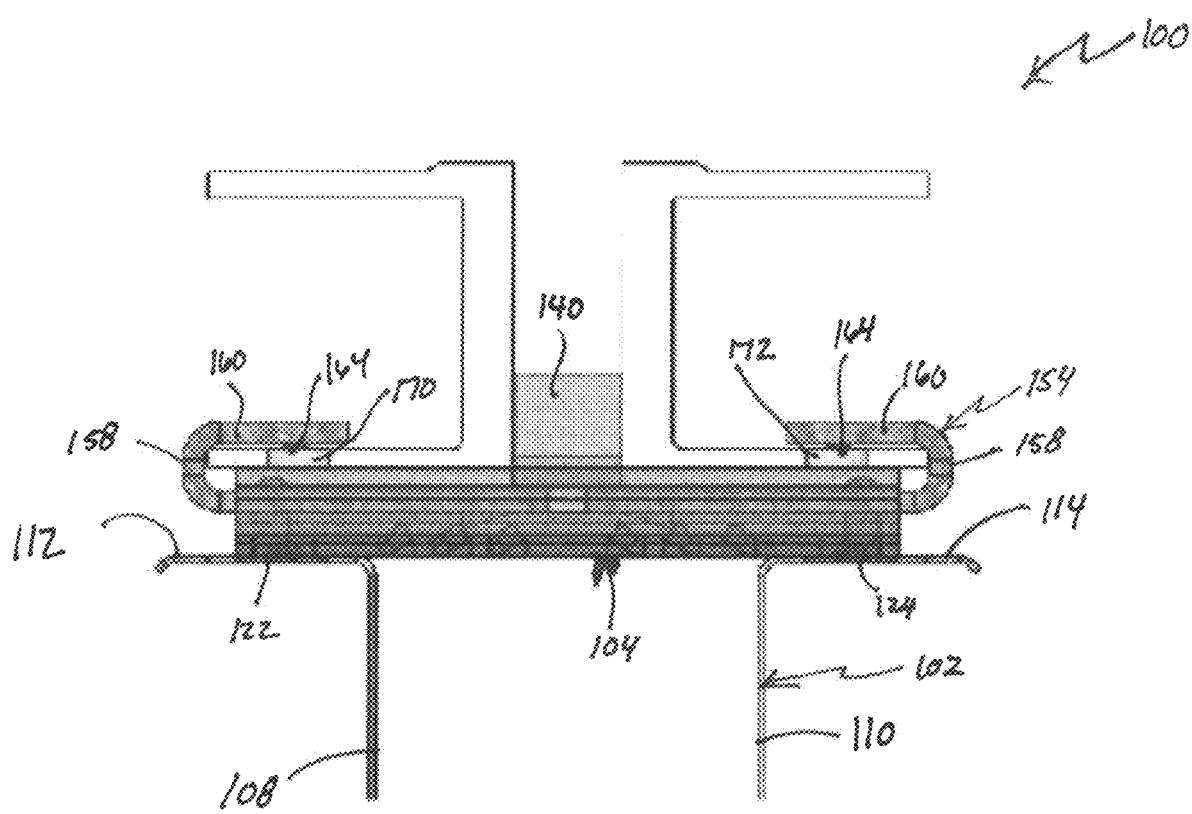
FIG. 11 is a cross sectional illustration of the mounting clamp base, the panel frames and the end caps cooperatively mounted to the support.

FIG. 11 is a cross sectional illustration of the mounting clamp base 104, panel frames 166, 168 and the end caps 154 cooperatively mounted to the support 102.

Figure 12:
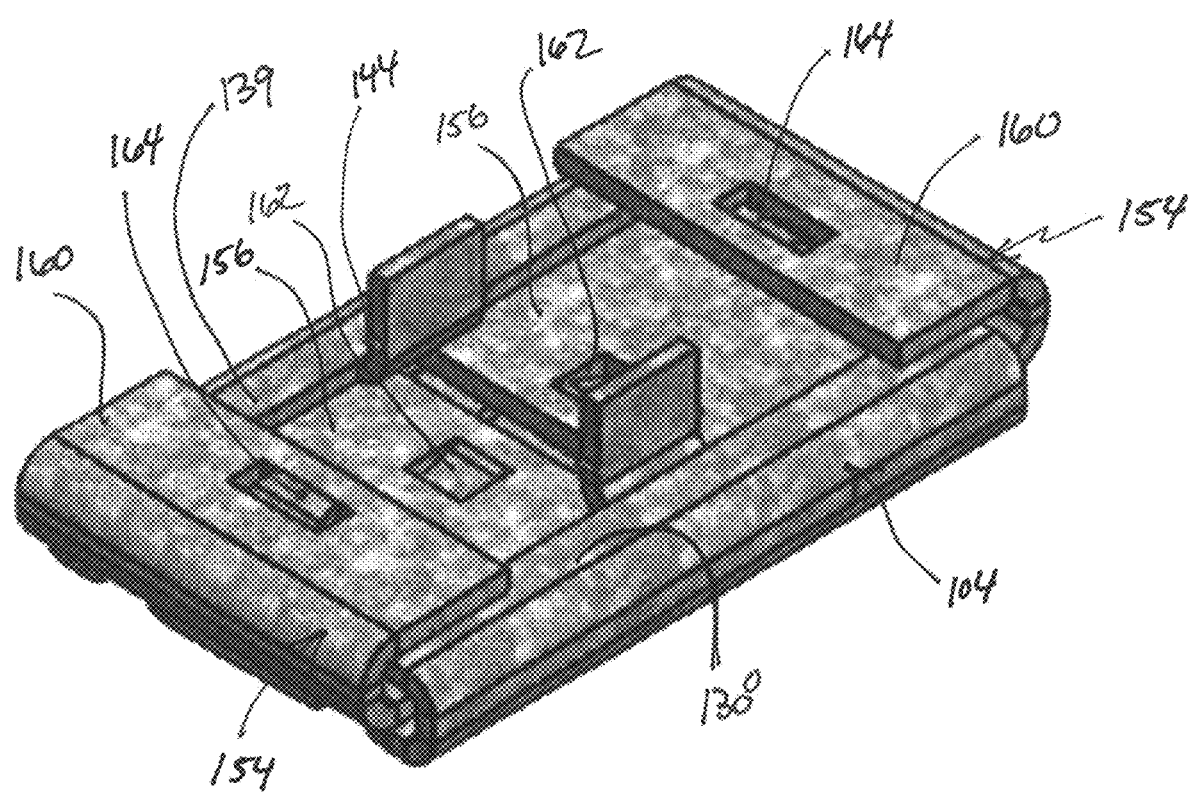
FIG. 12 is a perspective view of the mounting clamp base in positional agreement with the mounting clamp end caps.
Figure 13:
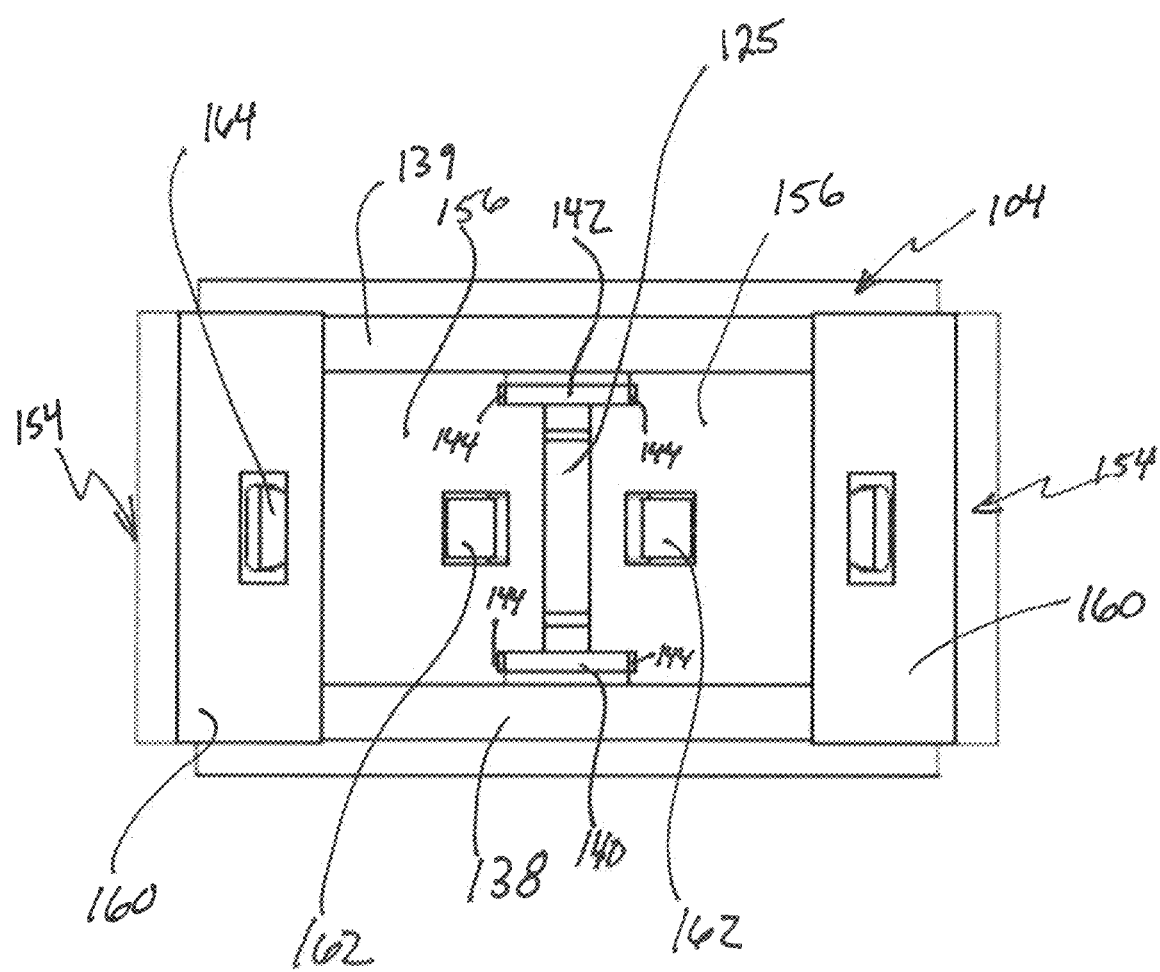
FIG. 13 is a top view of the mounting clamp base in positional agreement with the mounting clamp end caps.
Figure 14:
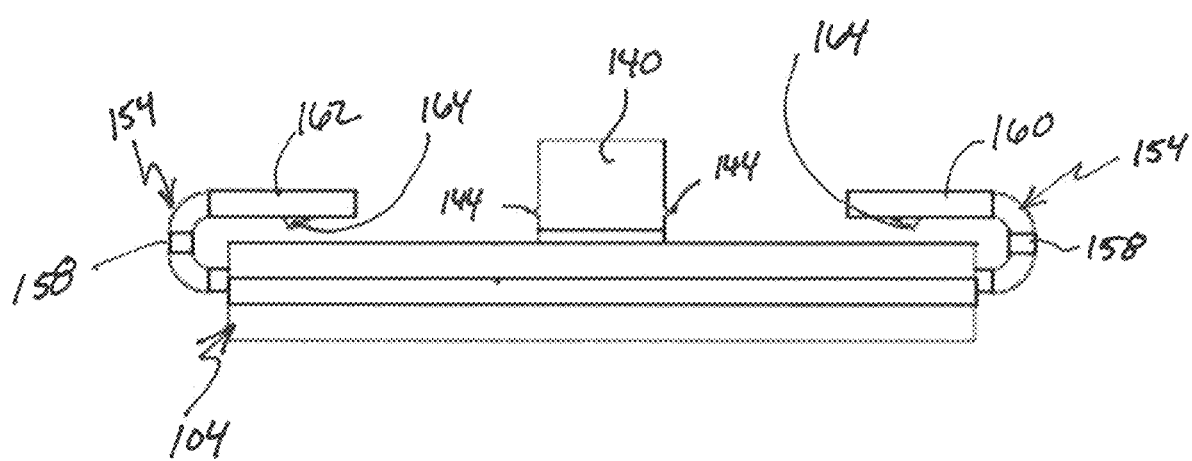
FIG. 14 is a first side view of the mounting clamp base in positional agreement with the mounting clamp end caps.
Figure 15:
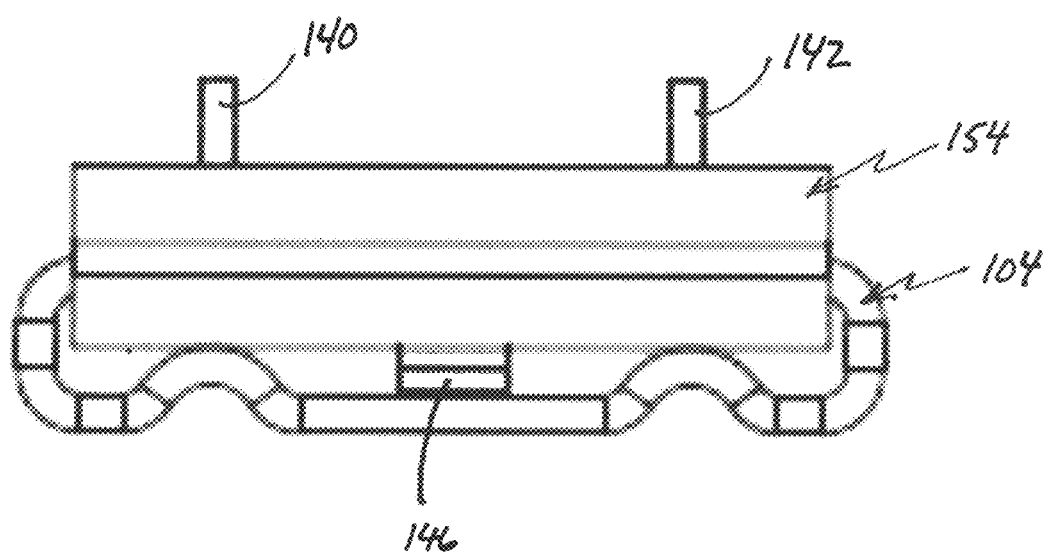
FIG. 15 is a second side view of the mounting clamp base in positional agreement with the mounting clamp end caps.

FIG. 12 is a perspective view of the mounting clamp base 104 in positional agreement with the mounting clamp end caps 154. FIG. 13 is a top view of the mounting clamp base 104 in positional agreement with the mounting clamp end caps 154. FIG. 14 is a first side view of the mounting clamp base 104 in positional agreement with the mounting clamp end caps 154, and FIG. 15 is a second side view of the mounting clamp base 104 in positional agreement with the mounting clamp end caps 154.

Figure 16:
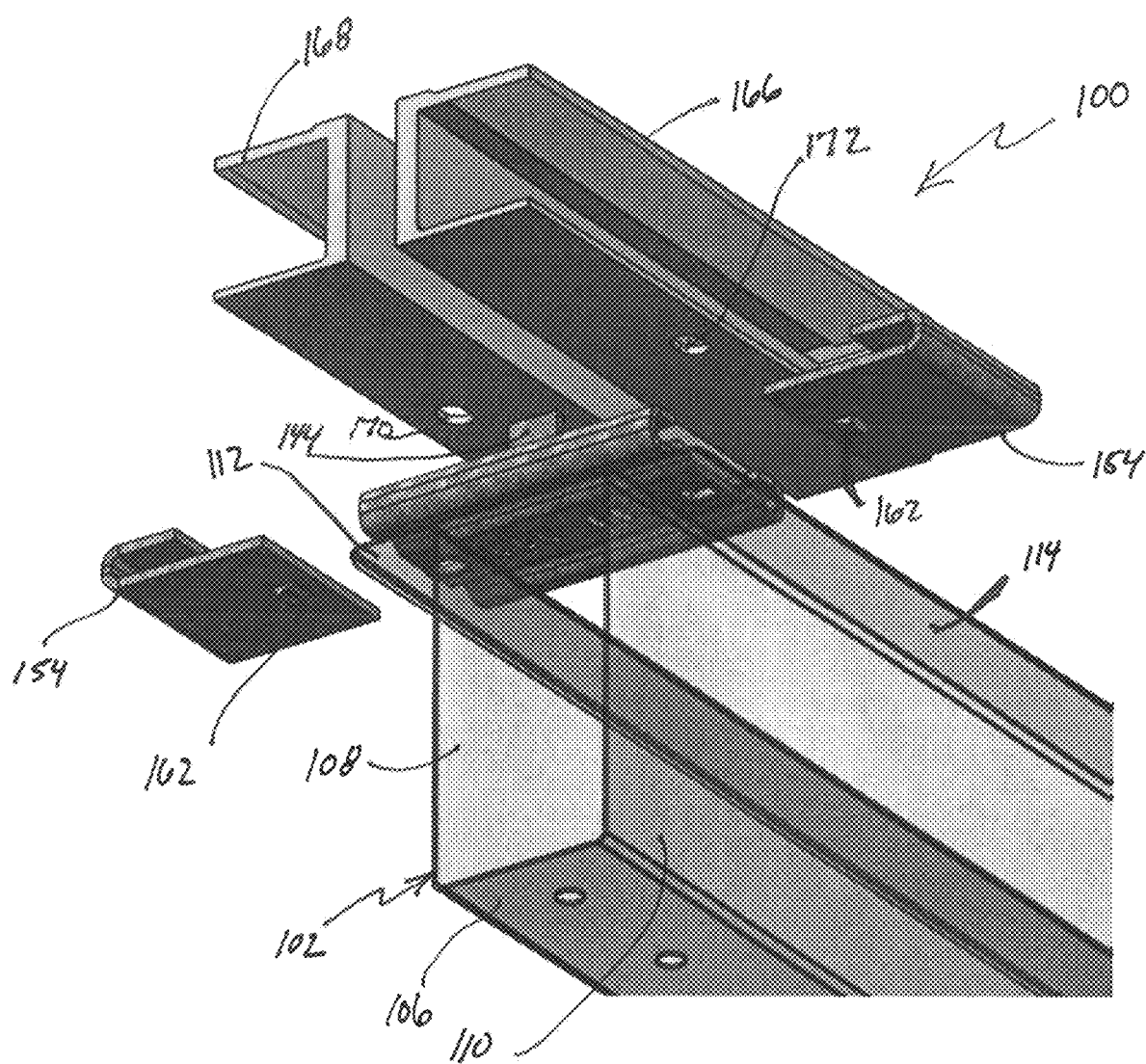
FIG. 16 is a perspective exploded assembly illustration of the portion of a support (e.g., a purlin) with the mounting clamp base positioned on the support purlin.

FIG. 16 is a perspective exploded assembly illustration of the portion of a support (e.g., a purlin) with the mounting clamp base 104 positioned on the support purlin 102 (fasteners not shown for ease of illustration). With the clamp base 104 secured to the flanges 112, 114, the first and second panel frames 166, 168 are positioned on the channel top surfaces 138, 139 of the base clamp adjacent to and separated by the upright fingers 140, 142. The panel frames 166, 168 each include an associated connection aperture 170, 172, respectively, which are positioned to coaxially align with the first and second through holes 116, 118 in the mounting base clamp web 125. So positioned, the mount clamp end caps 154 are inserted into the mounting base clamp longitudinal ends. As the first engagement surface 156 of the end cap 154 progresses into the mounting base clamp 104, the first chamfered end cap protuberance 162 slides over the associated chamfered protuberance 146. Once the chamfered end cap protuberance 162 slides over the associated chamfered protuberance 146 (see FIG. 3), the end cap 154 is locked in the mounting clamp base 104. The chamfered end cap protuberance 162 and the associated chamfered protuberance 146 cooperatively act as a latch or pawl.

Similarly, as the second engagement surface 160 of the end cap progresses into the mounting clamp base 104, the second chamfered end cap protuberance 164 engages (e.g., seats in) the associated connection aperture of the panel frame 166, 168.

With the panel frames 166, 168 secured as shown in FIG. 11, the serrated edges 144 of the upright fingers 140, 142 penetrate into the abutting panels.

Referring to FIGS. 1 and 3, it is contemplated that the web 125 may include one or more protuberances 146 on each longitudinal side of the upright fingers 142, or there may be a plurality of protuberances 146 as shown in FIG. 1.

Figure 17:
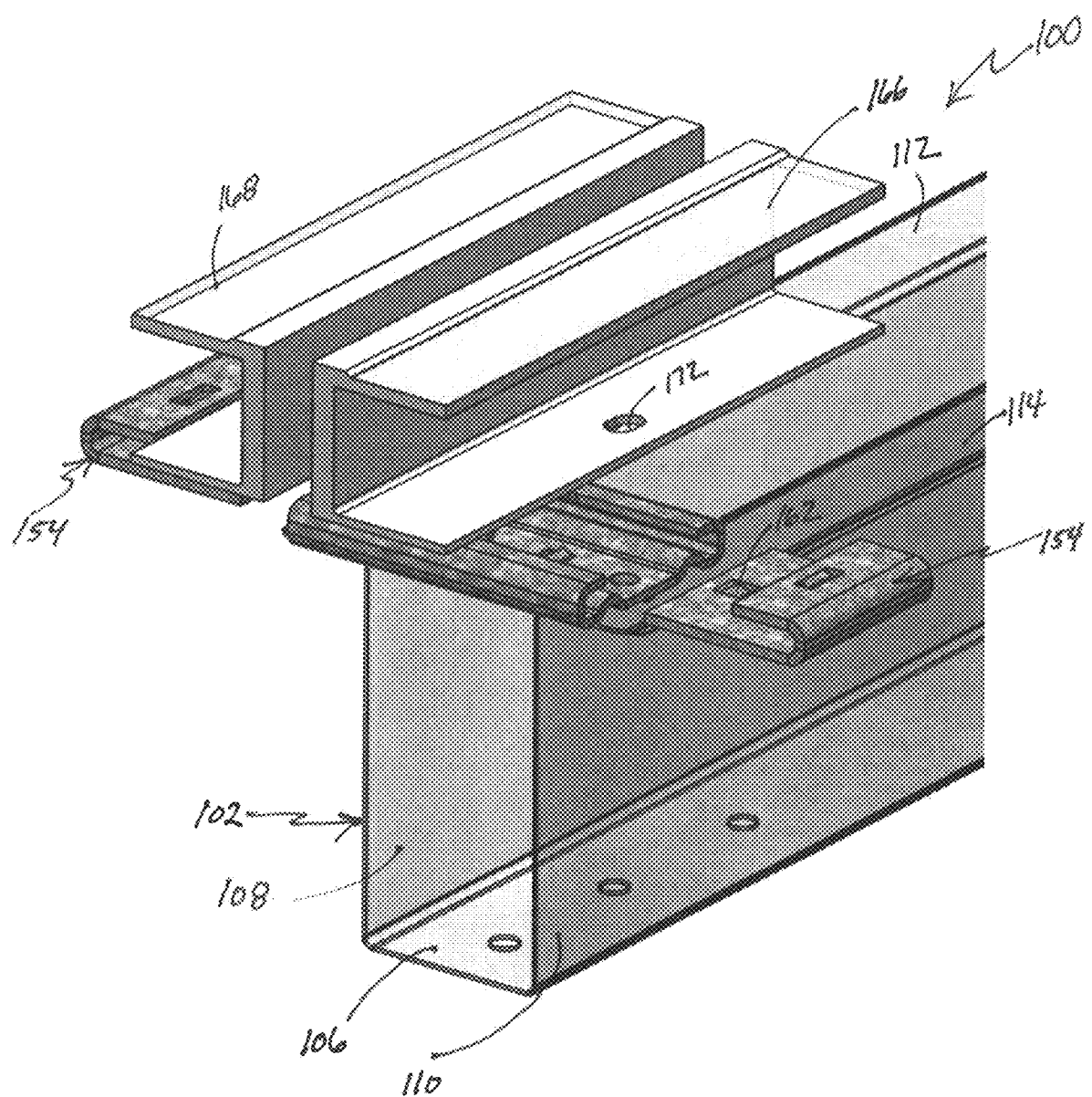
FIG. 17 is another perspective exploded assembly illustration of the portion of a support (e.g., a purlin) with the mounting clamp base positioned on the support purlin.
Figure 18:
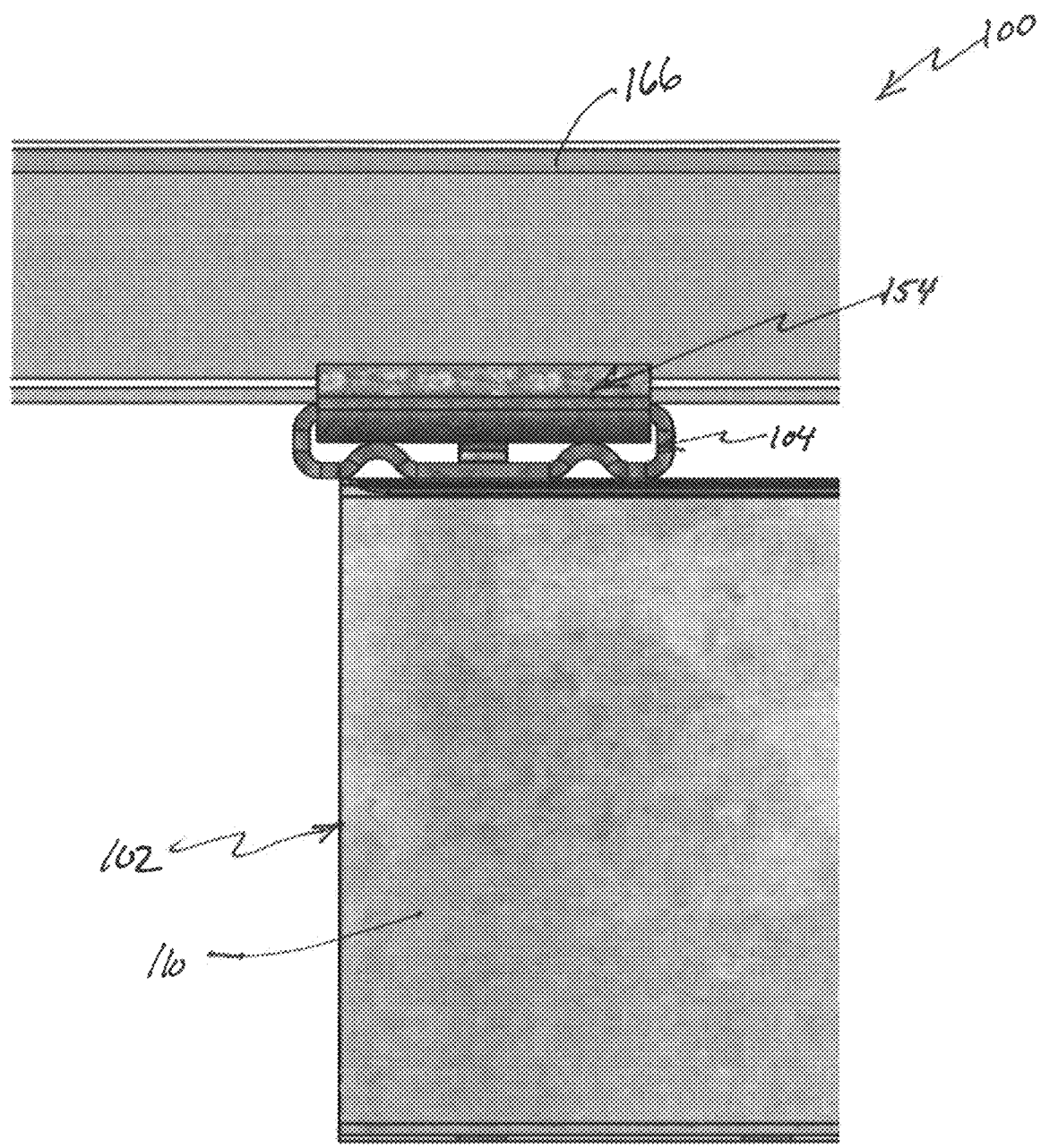
FIG. 18 is a side view of the mounting clamp base operably positioned with respect to the purlin, an end cap and a panel frame.

FIG. 17 is another perspective exploded assembly illustration of the portion of a support (e.g., a purlin) with the mounting clamp base positioned on the support purlin. FIG. 18 is a side view of the mounting clamp base operably positioned with respect to the purlin, an end cap and a panel frame.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for mounting a photovoltaic panel, comprising:
   a support that includes first and second parallel flange surfaces;
   first and second mounting clamp bases each fastened to an associated one of the first and second parallel flange surfaces, where each of the first and second mounting clamp bases comprises
      a clamp base web including first and second through holes longitudinally aligned along the web;
      domed uptakes radially extending from the clamp base web, where the domed uptakes separate the clamp base web from opposing first and second longitudinally extending channels each formed from an associated channel base surface, an associated channel sidewall and a channel top surface;
      opposing first and second upright fingers extending from each of the channel top surfaces in a direction perpendicular to the clamp base web surface, where each of the upright fingers includes one or more serrated edges on each of its longitudinal sidewalls;
      a first and second chamfered mounting clamp base protuberances that extend upward from the clamp base web; and
   a first mounting end cap that includes a first chamfered end cap protuberance that extends from a first engagement surface and a second chamfered end cap protuberance that extends from a second engagement surface;
   where the first chamfered mounting clamp base protuberance engages the first chamfered end cap protuberance and the second chamfered mounting clamp base protuberance engages the second chamfered end cap protuberance as the first engagement surfaces passes into the first and second longitudinally extending channels.

2. The assembly of claim 1, where the mount clamp base web is a planar surface.

3. The assembly of claim 2, where the channel sidewall is separated from the channel base surface via a first radiused edge, and the channel sidewall is separated from the channel top surface via a second radiused edge.

4. The assembly of claim 1, where the first mounting end cap is substantially J-shaped.

5. The assembly of claim 4, where a radiused edge separates the first upright finger and the first channel top surface.

6. An assembly for mounting a photovoltaic panel, comprising:
   a support that includes first and second parallel flange surfaces;
   first and second mounting clamp bases each fastened to an associated one of the first and second parallel flange surfaces, where each of the first and second mounting clamp bases comprises
      domed uptakes extending from a clamp base web, where the domed uptakes separate the clamp base web from opposing first and second longitudinally extending channels each formed from an associated channel base surface, an associated channel sidewall and a channel top surface;
      opposing first and second upright fingers extending from each of the channel top surfaces, where each of the upright fingers includes one or more serrated edges on each of its longitudinal sidewalls;
      a first and second chamfered mounting clamp base protuberances that extend from the clamp base web; and
   a first mounting end cap that includes a first chamfered end cap protuberance that extends from a first engagement surface and a second chamfered end cap protuberance that extends from a second engagement surface;
   where the first chamfered mounting clamp base protuberance engages the first chamfered end cap protuberance and the second chamfered mounting clamp base protuberance engages the second chamfered end cap protuberance as the first engagement surfaces passes into the first and second longitudinally extending channels.

* * * * *